Figure 1:
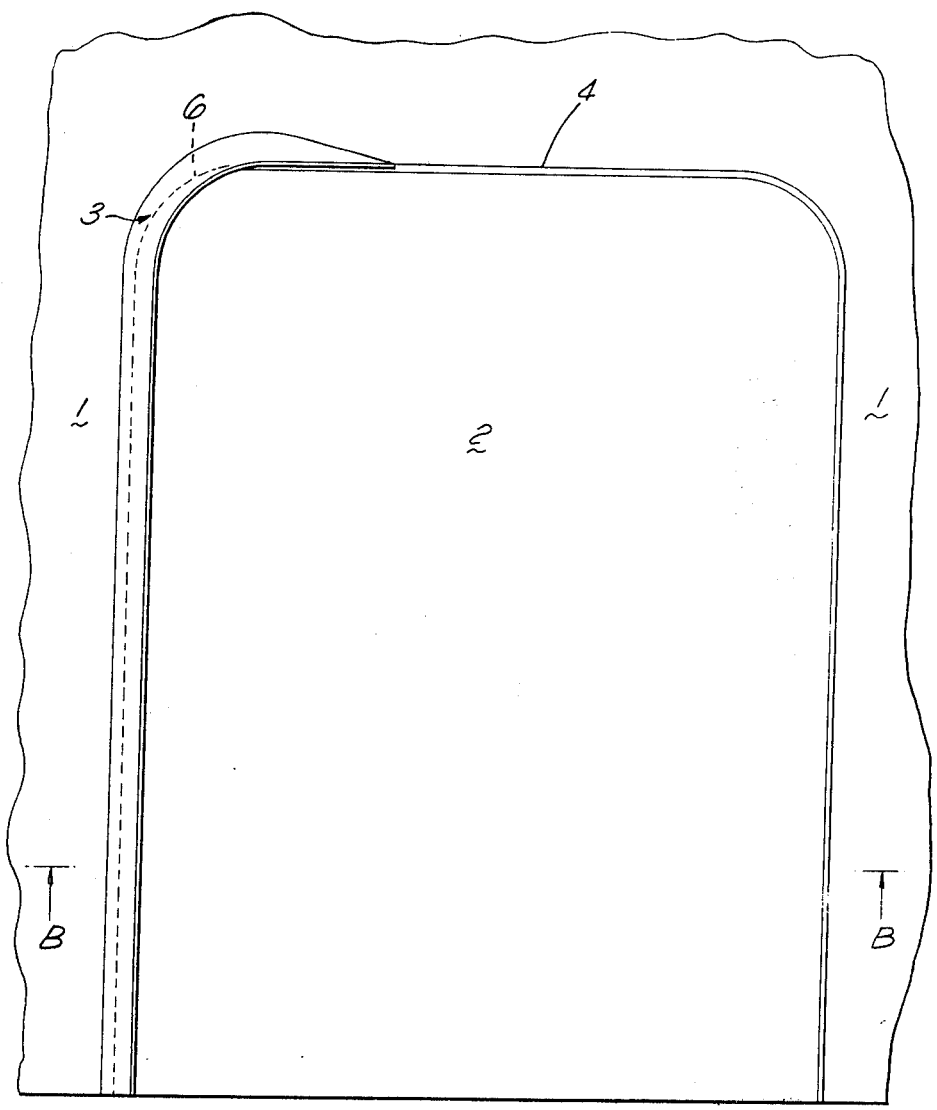

United States Patent [19]

Bos

[11] 4,113,302
[45] Sep. 12, 1978

[54] WIND DEFLECTOR

[75] Inventor: Frans Bos, Trollhattan, Sweden

[73] Assignee: Saab-Scania AB, Trollhattan, Sweden

[21] Appl. No.: 760,746

[22] Filed: Jan. 19, 1977

[30] Foreign Application Priority Data

Jan. 29, 1976 [SE] Sweden ............................. 7600938

[51] Int. Cl.² ............................................. B60J 7/22
[52] U.S. Cl. ................................ 296/137 J; 98/2.14
[58] Field of Search ...................... 296/137 J, 91, 1 S; 98/2.14

[56] References Cited

U.S. PATENT DOCUMENTS

| 3,843,195 | 10/1974 | Lidington | 296/137 J |
| 3,904,239 | 9/1975 | Jardin | 296/91 |
| 3,955,848 | 5/1976 | Lutz | 98/2.14 |

FOREIGN PATENT DOCUMENTS

| 1,131,218 | 2/1957 | France | 296/137 J |
| 1,455,838 | 6/1969 | Fed. Rep. of Germany | 296/137 J |

Primary Examiner—Joseph F. Peters, Jr.
Assistant Examiner—John A. Carroll
Attorney, Agent, or Firm—Schiller & Pandiscio

[57] ABSTRACT

A wind deflector for vehicles provided with a sun-roof of the kind having a generally rectangular opening and a shutter therefor, the wind deflector extending along the leading transverse edge of said opening. The wind deflector is relatively inexpensive to construct and comprises the outer metal sheet of the vehicle roof and forms an integral part therewith. The deflector has a rearwardly and upwardly inclined section, and includes a reinforcing plate fixed to the deflector and extending along the leading transverse edge of the roof opening. Preferably the highest point of the rearwardly and upwardly inclined portion lies substantially at the same height as the rear transverse edge of the roof opening. Also, the inclined portion preferably has a slope of between 5° and 35° relative to the forwardly lying portion of the roof. To ensure rigidity of the wind deflector, the upper edge of its rearwardly and outwardly inclined portion is folded around an end edge of the reinforcing plate.

7 Claims, 3 Drawing Figures

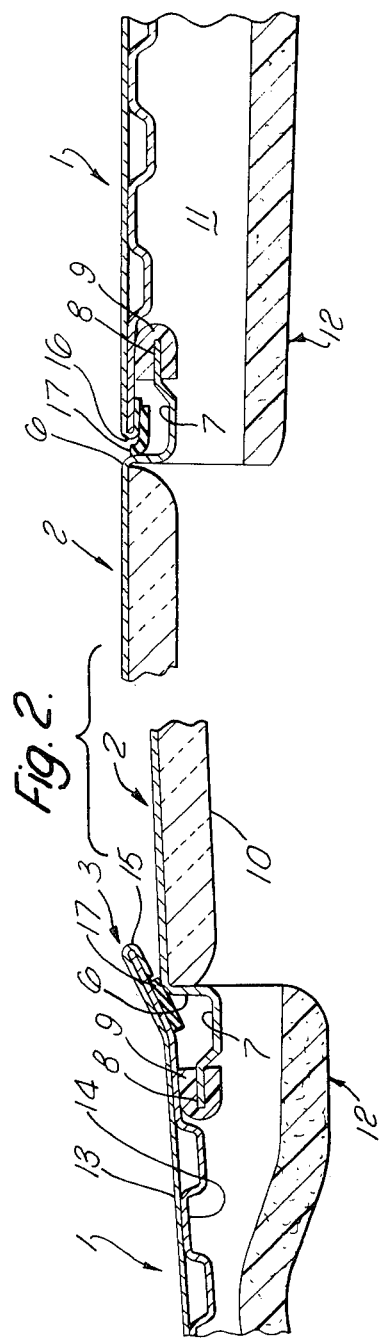
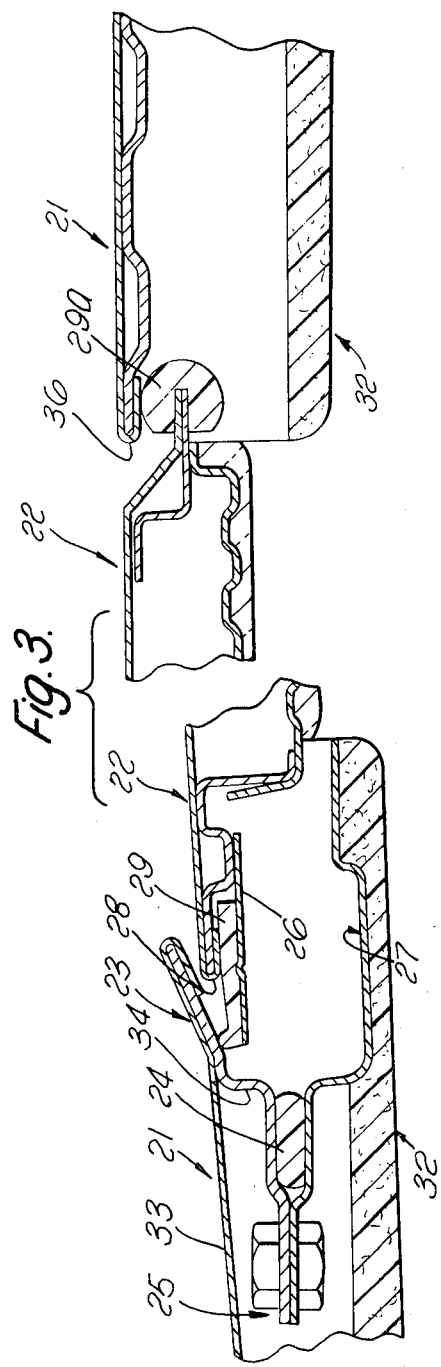

WIND DEFLECTOR

The present invention relates to a vehicle having a sun-roof, i.e. a roof with a generally rectangular opening therein which is closeable by means of a shutter, and, in particular, to a wind deflector therefor which normally extends along the entire length of the transverse leading edge of the roof opening and is arranged to overlap the forward edge of the shutter in the closed position thereof.

It is known for cars to be provided with sun-roofs with a wind deflector to prevent disturbing drafts and noises caused by wind when driving with the sun-roof fully or partially open. Wind deflectors in present day use are mostly in the form of transparent synthetic resin shields. These shields are mounted adjacent the leading edge of the roof opening and, in relation to the roof opening, extend a relatively long distance rearwardly. Other similar forms of wind deflectors intended to be mounted adjacent the leading edge of the roof opening are available on the market as ancilliary equipment.

Normally, wind deflectors mounted in such a manner give rise to wind noise in the gaps occurring where the wind deflector is mounted to the outer surface of the vehicle roof. When a vehicle on which such a wind deflector has been mounted travels at high speed, the wind deflector is bent rearwardly to some considerable extent thereby widening said gaps, which gives rise to a still higher wind noise. These gaps are also readily filled with dirt which retains moisture thereby presenting a serious risk of corrosion. The dimensions of the wind deflector are standardised so that a wind deflector of one and the same design can be mounted on a multiplicity of different makes of car. Thus, the design of the wind deflector is not optimal for any make of car. For example, in certain instances the vertical dimensions of the wind deflector may be excessive, whilst in other circumstances the vertical dimensions of the same wind deflector will be too small in relation to the level of the rear edge of the roof opening. The resulting aerodynamic design and the coefficient of air-resitance of such a wind deflector is far from being ideal. Moreover, the aesthetic appearance of such a wind deflector leaves much to be desired.

A wind deflector purchased as a piece of ancilliary equipment is normally secured along the leading edge of the roof opening by means of screws or by means of an adhesive. In either case, the work of mounting the wind deflector must be carried out with great accuracy, in order that the wind deflector is satisfactorily mounted and in order to obtain a good seal between the sun-roof and the roof frame.

The expensive and troublesome sun-assembly work associated with wind deflectors sold as ancilliary equipment, coupled with the fact that a wind deflector thus mounted is clumsy and ugly, has resulted in the provision of collapsible wind deflectors mounted beneath the sun-roof. These wind deflectors are raised and lowered automatically when the sun-roof is opened and closed respectively. The wind deflector is housed in a housing provided with drainage means and arranged beneath the leading edge of the sun-roof opening. This housing, however, greatly restricts the ceiling height of the vehicle and also presents a hazard which could result in injury to a vehicle passenger. The mechanism by which the wind deflector is automatically raised and lowered also adds weight to the vehicle which deleteriously affects the position of the centre of gravity of the vehicle. When raised, the wind deflector also gives rise to wind noise which often exceeds the level of wind noise obtained with a wind deflector mounted separately on the vehicle. This wind noise is caused primarily by a relatively abrupt transition from the sheet-metal portion of the roof to the wind deflector, said transition region often having a wide gap. The width of the gap also varies when the wind deflector is subjected to greater or lesser wind forces, owing to the relative instability of the wind deflector.

An object of the present invention is to provide a wind deflector which eliminates or at least greatly reduces the aforementioned disadvantages.

According to the invention a wind deflector is characterised in that the wind deflector comprises the outer metal sheet of the vehicle roof and forms an integral part therewith, said deflector having a rearwardly and upwardly inclined section, and in that a reinforcing plate is fixed to the inside of said deflector and extends along said leading transverse edge of the roof opening.

A wind deflector in accordance with the invention is far less expensive to construct than hitherto known wind deflectors, since the cost of providing the roof of a vehicle with such a wind deflector is small. Moreover, the amount of wind noise obtained with such a wind deflector is far less than that produced with known wind deflectors, due to the fact that with the claimed wind deflector there are no outwardly open gaps, joints or the like of any form.

In order that the invention will be readily understood and further features made apparent, a plurality of exemplary embodiments of the invention will now be described in more detail with reference to the accompanying drawings, in which:

FIG. 1 is a plan view of the right-hand portion of a vehicle roof with a sun-roof therein;

FIG. 2 is a fragmentary cross-sectional view on the line B—B of FIG. 1, said view being of larger scale with a central portion of the sun-roof removed, (the differences in levels occurring in reality between the leading and trailing edges of the roof opening are indicated by the misalignment of the roof line on either side of the break lines); and FIG. 3 is a view corresponding to FIG. 2 of a wind deflector according to the invention applied to an alternative sun-roof construction.

In FIG. 1 there is shown the roof 1 of a vehicle provided with a sun-roof opening and a shutter 2 with which the opening can be exposed and closed in a known manner. Along the whole length of the leading edge of the roof opening a wind deflector 3 is arranged, which is curved upwardly relative to the basic line of the roof for deflecting the slip-stream occurring when the vehicle is in motion and for preventing wind from flowing into the vehicle when the sun-roof is open. The dash-line in FIG. 1 indicates where the wind deflector begins to curve from the surrounding, substantially planar vehicle roof 1, and consquently represents the base line of the wind deflector 3. As shown in FIG. 1, at the ends of the leading edge of the roof opening, the wind deflector 3 has radial contours around the corners which join the said leading edge with the longitudinally extending side edges 4 of said roof opening, which radial contours are shaped to rapidly merge with the side edges 4 of the roof opening and the basic line of the vehicle roof; preferably the point at which said contours merge with said roof line is less than half the total length of said roof opening. The wind deflector 3 is arranged to overlap the shutter 2 when said shutter is closed. This is illustrated in FIGS. 2 and 3 and can also be seen from the dash-line in FIG. 1 representing the forward end edge 6 of the shutter 2 in the roof line. The end edge 6 of the outer surface of the shutter 2 is provided inwardly of the roof line with a forwardly extending channel 7 arranged to locate beneath the wind deflector 3, the forward edge portion 8 of the channel 7 being provided with a seal 9 which abuts the inner surface of the vehicle roof 1 in the closed position of the shutter 2. The channel 7 forms part of the sun-roof drainage arrangement for conducting rain water to orifices adjacent the door-posts of the vehicle in a known manner. The drainage arrangement forms no part of the invention and will not be described in any further detail.

By forming the wind deflector 3 integrally with the vehicle roof 1, a particularly thin sun-roof construction is possible. In FIG. 2, the surface of the shutter 2 facing the interior of the vehicle is provided with heat and sound insulating trim 10. Also, the dimensions of the shutter 2 are adapted to a space 11 located behind the roof opening and between the vehicle roof 1 and a ceiling 12 of the vehicle interior. The shutter 2 is displaceable towards the space 11 by means of a drive and control arrangement (not shown) arranged along the side edges of the roof opening and within the space 11. The ceiling 12 of the vehicle is conveniently formed as a unit from, for example, pressed glass wool, and is arranged to provide a gap along the forward, rear and side edges of the roof opening, thereby providing the space required for housing the movable shutter together with its drainage and displacement means.

In the embodiment shown in FIG. 2, the wind deflector 3 is formed integrally with the surface plate 13 of the vehicle roof by providing said plate with a rearwardly and upwardly curved portion along the leading edge of the roof opening during the pressing process. This rearwardly and upwardly curved portion preferably has a planar slope, but may also be given a concave or convex shape. To impart sufficient rigidity to the wind deflector 3 and the roof portions adjacent the roof opening, a reinforcing plate 14 of generally corrugated configuration is bonded to said portions with an adhesive. The outer plate 13 is folded around the end edge of the reinforcing plate 14 so as to provide a rounded edge 15. In order that the wind deflector 3 is able to guide the air stream in a satisfactory manner whilst the vehicle is in motion, the end edge 15 of the wind deflector 3 should lie on substantially the same level as the rear edge 16 of the roof opening, as indicated in FIGS. 2 and 3. The angle at which the wind deflector 3 is inclined relative to the roof line of the vehicle roof 1 should lie between 5° and 35°, depending upon the body design of the vehicle, so that the air can be guided without causing disturbing turbulance whilst ensuring that air in the interior of the vehicle is constantly changed, via the roof opening, in a comfortable manner. The extent to which the wind deflector 3 overlaps the shutter 2 when the shutter is closed depends upon what is required for the outer surface of the shutter 2 to lie at the same level as the basic line of the vehicle roof in front of the shutter.

To provide for sound installation, a sealing strip 17 is conveniently placed between the shutter 2 and the wind deflector 3 relatively close to the end edge 15 of the deflector. By providing in this way a double seal between the shutter 2 and the wind deflector 3, as illustrated in FIG. 2, sound originating from external sources is effectively dampened. Furthermore, the sealing strip 17 prevents dirt and other undesirable matter, which would affect efficient drainage, from falling into the channel 7.

The embodiment illustrated in FIG. 3 is somewhat similar to the type of sun-roofs normally associated with wind deflectors which can be raised and lowered automatically. Because the wind deflector is formed integrally with the vehicle roof, in accordance with the invention, a considerable gain in ceiling height is obtained, since the space which the known arrangement required for housing the lowered wind deflector and a drainage system associated therewith, is greatly reduced. In this embodiment only one drainage channel 27 is required, which is securely connected to the vehicle roof 21, and which is arranged at a certain distance beneath the sealing contact of the shutter 22 with the wind deflector 23. This distance can be selected within limits determined by the thickness of the shutter 22, and the position of the channel 27 does not therefore affect the height of the ceiling 32. The channel 27 is attached to a reinforcing plate 34 by means of a screw joint 25 having a seal 24, said reinforcing plate, in a manner similar to the FIG. 2 embodiment, abutting the outer plate 33 of the vehicle roof 21 and the wind deflector 23. A sealing contact is provided between the wind deflector 23 and the shutter 22 by means of a seal 29 attached to the end edge 28 of the shutter 22, effective abuttment of the seal 29 against the wind deflector being ensured by a support bar 26 attached to the shutter 22. This sealing arrangement also extends along the side edges of the roof opening, while a sealing strip 29a is glued onto the rear edge of the shutter and serves to seal the rear edge 36 of the roof opening. With the exception of the described sealing and drainage arrangement, the embodiment illustrated in FIG. 3 with a fixed wind deflector corresponds to the embodiment described with reference to FIG. 2.

A fixed wind deflector according to the present invention can be modified within the scope of the following claims. For example, when viewed in cross-section, the wind deflector instead of being of planar, concave, or convex form, may be S-shaped i.e. have a concave-convex form. Further, the point at which the wind deflector merges with the basic shape of the roof may be set more rearwardly of the leading edge than shown in FIG. 1.

I claim:

1. In a motor vehicle having a sheet metal roof, a generally rectangular opening in the roof, a shutter movable between open and closed positions for respectively opening and closing said rectangular opening, and a wind deflector extending at the leading transverse edge of said opening across the whole width of said opening, the improvement wherein said wind deflector comprises an integral part of the outer metal sheet of said vehicle roof, said deflector having a rearwardly and upwardly inclined section which overlaps the leading edge of said shutter when the latter is in a closed position, and a reinforcing plate fixed to the inside of said deflector and extending along said leading transverse edge of said roof opening.

2. In a motor vehicle according to claim 1, wherein the highest point of the rearwardly and upwardly inclined portion of said deflector lies substantially at the same level as the rear transverse edge of said roof opening.

3. In a motor vehicle according to claim 1, wherein the upper edge of the rearwardly and outwardly inclined portion of said deflector is folded around an end edge of said reinforcing plate.

4. In a motor vehicle according to claim 1, wherein the rearwardly and upwardly inclined portion of said deflector has a slope of between 5 and 35° relative to the forwardly lying portion of said roof.

5. In a motor vehicle according to claim 1, and further including a sealing strip arranged to locate between the inside of said wind deflector and said shutter when the latter is in a closed position.

6. In a motor vehicle according to claim 1, wherein the rearwardly and upwardly inclined portion of said deflector has radial contours at the ends of said leading transverse edge of said roof opening for passing around the leading corners of said roof opening, said contours being shaped to merge with the line of said roof.

7. In a motor vehicle according to claim 6, wherein the point at which said contours merge with said roof line is less than half the total length of said roof opening.

* * * * *